(12) United States Patent
Lee

(10) Patent No.: US 10,135,474 B2
(45) Date of Patent: Nov. 20, 2018

(54) ELECTRONIC APPARATUS AND CONTROL METHOD THEREOF

(71) Applicant: SAMSUNG ELECTRONICS CO., LTD., Suwon-si, Gyeonggi-do (KR)

(72) Inventor: Hyung-yong Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/685,735

(22) Filed: Aug. 24, 2017

(65) Prior Publication Data

US 2018/0069578 A1    Mar. 8, 2018

(30) Foreign Application Priority Data

Sep. 8, 2016 (KR) .................. 10-2016-0115570

(51) Int. Cl.
| | | |
|---|---|---|
| *H04B 7/00* | (2006.01) | |
| *H04B 1/10* | (2006.01) | |
| *H01Q 21/28* | (2006.01) | |
| *H01Q 1/24* | (2006.01) | |
| *H04B 1/713* | (2011.01) | |

(52) U.S. Cl.
CPC .......... *H04B 1/1027* (2013.01); *H01Q 21/28* (2013.01); *H01Q 1/248* (2013.01); *H04B 1/713* (2013.01)

(58) Field of Classification Search
CPC ........ H04B 1/10; H04B 1/1027; H04B 1/715; H04B 1/0475
See application file for complete search history.

(56) References Cited

U.S. PATENT DOCUMENTS

| | | | |
|---|---|---|---|
| 7,400,612 B2* | 7/2008 | Yamaura | H04B 1/401 370/338 |
| 8,934,387 B2* | 1/2015 | He | H04W 52/0238 370/311 |
| 2013/0210364 A1* | 8/2013 | Mayor | H04B 1/3805 455/63.1 |

FOREIGN PATENT DOCUMENTS

KR    10-2009-0093120    9/2009

* cited by examiner

*Primary Examiner* — Tuan Pham
(74) *Attorney, Agent, or Firm* — Staas & Halsey LLP

(57) ABSTRACT

An electronic apparatus includes a first communicator, a second communicator and a controller. The first communicator has one of a first operation mode for a first communication with an external apparatus, and a first idle mode for pausing the first communication. The second communicator has one of a second operation mode for a second communication different in standard from the first communication with an external apparatus, and a second idle mode for pausing the second communication. The controller controls the first communicator and the second communicator to adjust a length of a simultaneous operation section where the first operation mode and the second operation mode are simultaneously implemented, in accordance with a degree of interference between the first communication and the second communication. With this, performance of wireless communication is more efficiently improved.

18 Claims, 11 Drawing Sheets

FIG. 10

| | NUMBER OF EXTERNAL APPARATUSES TO BE PAIRED (FIRST COMMUNICATION) | RETRANSMISSION RATE | DATA RATE (SECOND COMMUNICATION) |
|---|---|---|---|
| INDEPENDENT OPERATION OF FIRST COMMUNICATOR | 4 | 0% | - |
| INDEPENDENT OPERATION OF SECOND COMMUNICATOR | - | 0% | 80Mbps |
| COMPLETE TIME-DIVISIONAL OPERATION | 2 | 0% | 45Mbps |
| WITHOUT ALGORITHM | 1 | 40% | 10Mbps |
| WITH ALGORITHM | 4 | 5% | 55Mbps |

1000

ELECTRONIC APPARATUS AND CONTROL METHOD THEREOF

CROSS-REFERENCE TO RELATED APPLICATIONS

This application claims priority from Korean Patent Application No. 10-2016-0115570 filed on Sep. 8, 2016, in the Korean Intellectual Property Office, the disclosure of which is incorporated herein by reference in its entirety.

BACKGROUND

1. Field

Apparatuses and methods disclosed herein with respect to exemplary embodiments relate to an electronic apparatus and a control method thereof, and more particularly to an electronic apparatus with a plurality of communicators, between which interference may occur, and a control method thereof.

2. Description of the Related Art

With increased demand for a variety of services on an electronic apparatus, there is a need of performing reliable high-speed data communication within a limited frequency band. Various communication devices use different frequency bands to minimize interference between them. If the communication devices use adjacent frequency bands, they spatially or electrically isolate their respective antennas for communication from each other to thereby minimize the interference.

However, it is difficult to fully isolate a plurality of antennas from one another because of a limited size of a printed circuit board (PCB) as the electronic apparatus has been miniaturized and had various designs. Although the antennas are designed to be isolated from one another, interference may occur between the antennas being used in communication due to various causes such as assembly tolerance in mass production, environmental factors, physical properties of the antennas, etc. Thus, there is a problem that performance of wireless communication is deteriorated by the interference.

SUMMARY

Accordingly, an aspect of one or more exemplary embodiments may provide an electronic apparatus, which improves performance of wireless communication by efficiently eliminating interference between a plurality of communications, and a control method thereof.

According to an exemplary embodiment, there is provided an electronic apparatus including: a first communicator configured to have one of a first operation mode for a first communication with an external apparatus, and a first idle mode for pausing the first communication, a second communicator configured to have one of a second operation mode for a second communication different in standard from the first communication with an external apparatus, and a second idle mode for pausing the second communication, and a controller configured to control the first communicator and the second communicator to adjust a length of a simultaneous operation section where the first operation mode and the second operation mode are simultaneously implemented, in accordance with a degree of interference between the first communication and the second communication. Thus, the interference between the plurality of communications is efficiently eliminated, and the performance of the wireless communication is improved.

The controller may control the first communicator and the second communicator to decrease the simultaneous operation section as the degree of the interference become higher, thereby efficiently eliminating the interference between the plurality of communications.

The controller may minimize the simultaneous operation section if the degree of the interference is higher than a threshold level, thereby minimizing the interference by complete time-division between the first communication and the second communication when the degree of the interference is high.

The controller may determine the degree of the interference as a condition for sensing the interference is satisfied, thereby improving a power consumption efficiency of the electronic apparatus since the interference is sensed only when there is a need of sensing the interference.

The condition for sensing the interference may include at least one among feedback from the external apparatus, a predetermined period of time elapsed after sensing the interference, change in position of the electronic apparatus, and power-on of the electronic apparatus, thereby introducing various conditions for determining the degree of the interference.

The controller may determine the degree of the interference based on an error rate of a signal received from one of the first communicator and the second communicator, thereby introducing a method of determining the degree of the interference.

The controller may determine the degree of the interference based on a signal transmitted from one of the first communicator and the second communicator and received in the other one, thereby further introducing a method of determining the degree of the interference.

The signal may have a frequency corresponding to at least one of the first communication and the second communication, thereby more efficiently eliminating the interference between the communications by taking the frequency at which the communication is implemented into account for preventing the interference.

The controller may determine the degree of the interference based on a difference between a first signal received in the first communicator during the simultaneous operation section and a second signal received in the first communicator while the second communicator is in the second idle mode, thereby further introducing a method of determining the degree of the interference.

According to another exemplary embodiment, there is provided a method of controlling an electronic apparatus, the method including: performing a first communication with an external apparatus in a first operation mode, and pausing the first communication in a first idle mode, performing a second communication different in standard from the first communication with an external apparatus in a second operation mode, and pausing the second communication in a second idle mode, and adjusting a length of a simultaneous operation section where the first operation mode and the second operation mode are simultaneously implemented, in accordance with a degree of interference between the first communication and the second communication. Thus, the interference between the plurality of communications is efficiently eliminated, and the performance of the wireless communication is improved.

The adjusting the length of the simultaneous operation section may include decreasing the simultaneous operation section as the degree of the interference become higher, thereby efficiently eliminating the interference between the plurality of communications.

The adjusting the length of the simultaneous operation section may include minimizing the simultaneous operation section if the degree of the interference is higher than a threshold level, thereby minimizing the interference by complete time-division between the first communication and the second communication when the degree of the interference is high.

The adjusting the length of the simultaneous operation section may include determining the degree of the interference as a condition for sensing the interference is satisfied, thereby improving a power consumption efficiency of the electronic apparatus since the interference is sensed only when there is a need of sensing the interference.

The condition for sensing the interference may include at least one among feedback from the external apparatus, a predetermined period of time elapsed after sensing the interference, change in position of the electronic apparatus, and power-on of the electronic apparatus, thereby introducing various conditions for determining the degree of the interference.

The adjusting the length of the simultaneous operation section may include determining the degree of the interference based on an error rate of a received signal, thereby introducing a method of determining the degree of the interference.

The adjusting the length of the simultaneous operation section may include determining the degree of the interference based on a signal transmitted by performing one of the first communication and the second communication and received by performing the other one, thereby further introducing a method of determining the degree of the interference.

The signal may have a frequency corresponding to at least one of the first communication and the second communication, thereby more efficiently eliminating the interference between the communications by taking the frequency at which the communication is implemented into account for preventing the interference.

The adjusting the length of the simultaneous operation section may include determining the degree of the interference based on a difference between a first signal received by the first communication during the simultaneous operation section and a second signal received by the first communication in the second idle mode, thereby further introducing a method of determining the degree of the interference.

BRIEF DESCRIPTION OF THE DRAWINGS

The above and/or other aspects will become apparent and more readily appreciated from the following description of exemplary embodiments, taken in conjunction with the accompanying drawings, in which:

FIG. 10 shows simulation results of the electronic apparatus according to an exemplary embodiment.

DETAILED DESCRIPTION

Figure 1:
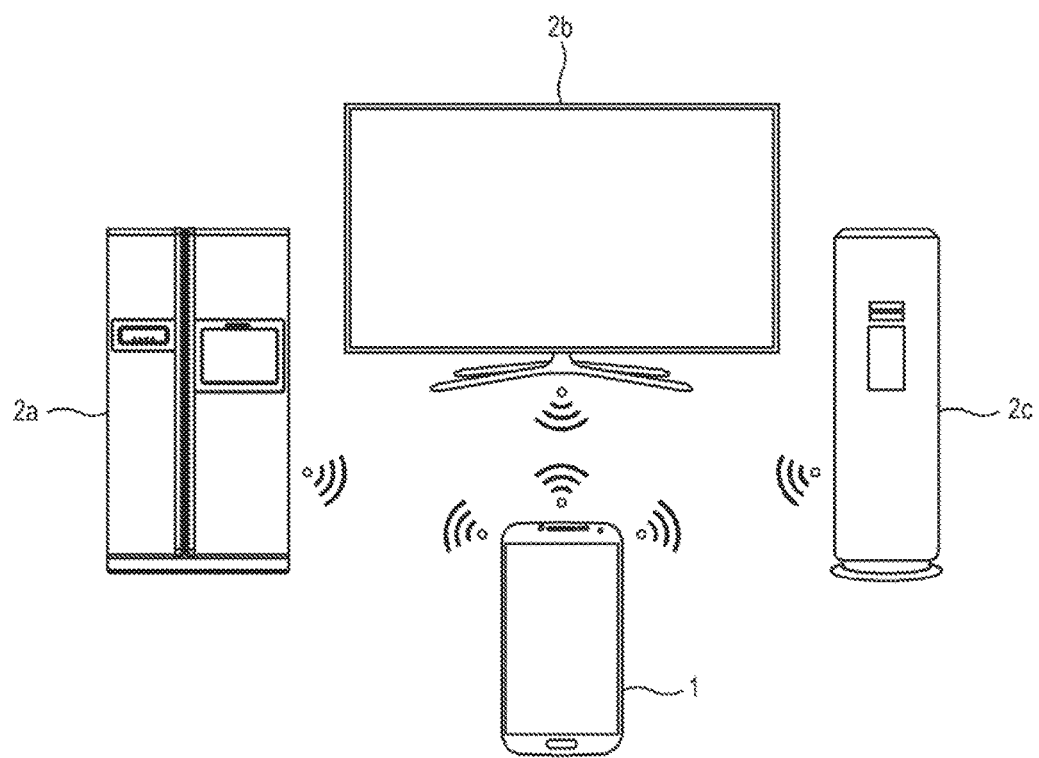
FIG. 1 illustrates an electronic apparatus according to an exemplary embodiment.

Hereinafter, exemplary embodiments will be described in detail with reference to accompanying drawings. In the following exemplary embodiments, elements shown in the accompanying drawings will be described, in which like reference numerals refer to like elements having substantially the same function throughout.

FIG. 1 illustrates an electronic apparatus according to an exemplary embodiment. The electronic apparatus 1 according to an exemplary embodiment may be achieved by a smart phone. Alternatively, the electronic apparatus 1 may be materialized by various apparatuses capable of performing wireless communication with external apparatuses 2a, 2b and 2c such as a tablet computer, a personal computer, a multimedia player, a television (TV), an electronic frame, a digital signboard, a large format display (LFD), signage, a smart watch, a head-mount display or the like wearable device, etc. but not limited thereto.

The electronic apparatus 1 according to an exemplary embodiment performs communication with the external apparatuses 2a, 2b and 2c. In this exemplary embodiment the electronic apparatus 1 may perform the communications of the same or different standards with the respective external apparatuses 2a, 2b and 2c. For example, the electronic apparatus 1 may perform a first communication with a first to third external apparatuses 2a, 2b and 2c. Alternatively, the electronic apparatus 1 may perform the first communication with the first external apparatus 2a, a second communication with the second external apparatus 2b and a third communication with the third external apparatus 2c. The first communication, the second communication and the third communication may be different in standard from one another and use frequency bands adjacent to each other, but not limited thereto. Further, the communication performed by the electronic apparatus 1 is not limited to a communication with neighboring external apparatuses 2a, 2b and 2c, but includes a communication with remote external apparatuses 2a, 2b and 2c. Hereinafter, a section where at least two among the first to third communications are simultaneously performed will be called a simultaneous operation section (see '502' in FIG. 5). In the simultaneous operation section 502, interference between the respective communications causes the communications to be deteriorated in performance. Therefore, the electronic apparatus 1 according to an exemplary embodiment determines a degree of interference between the communications while performing the communications of different standards with the plurality of external apparatuses 2a, 2b and 2c, and time-divisionally performs the respective communications in accordance with the determined degree of the interference, thereby adjusting the length of the simultaneous operation section 502.

The electronic apparatus 1 adjusts the simultaneous operation section 502 in accordance with the degree of the interference between the communications, thereby decreasing error rate, electromagnetic attenuation, distortion and noise of each communication. Thus, the electronic apparatus 1 according to an exemplary embodiment decreases interference between the communications even though communicators are not completely isolated from each other, and improves the performance of the wireless communication since there are no needs of retransmitting a signal due to an error.

Figure 2:
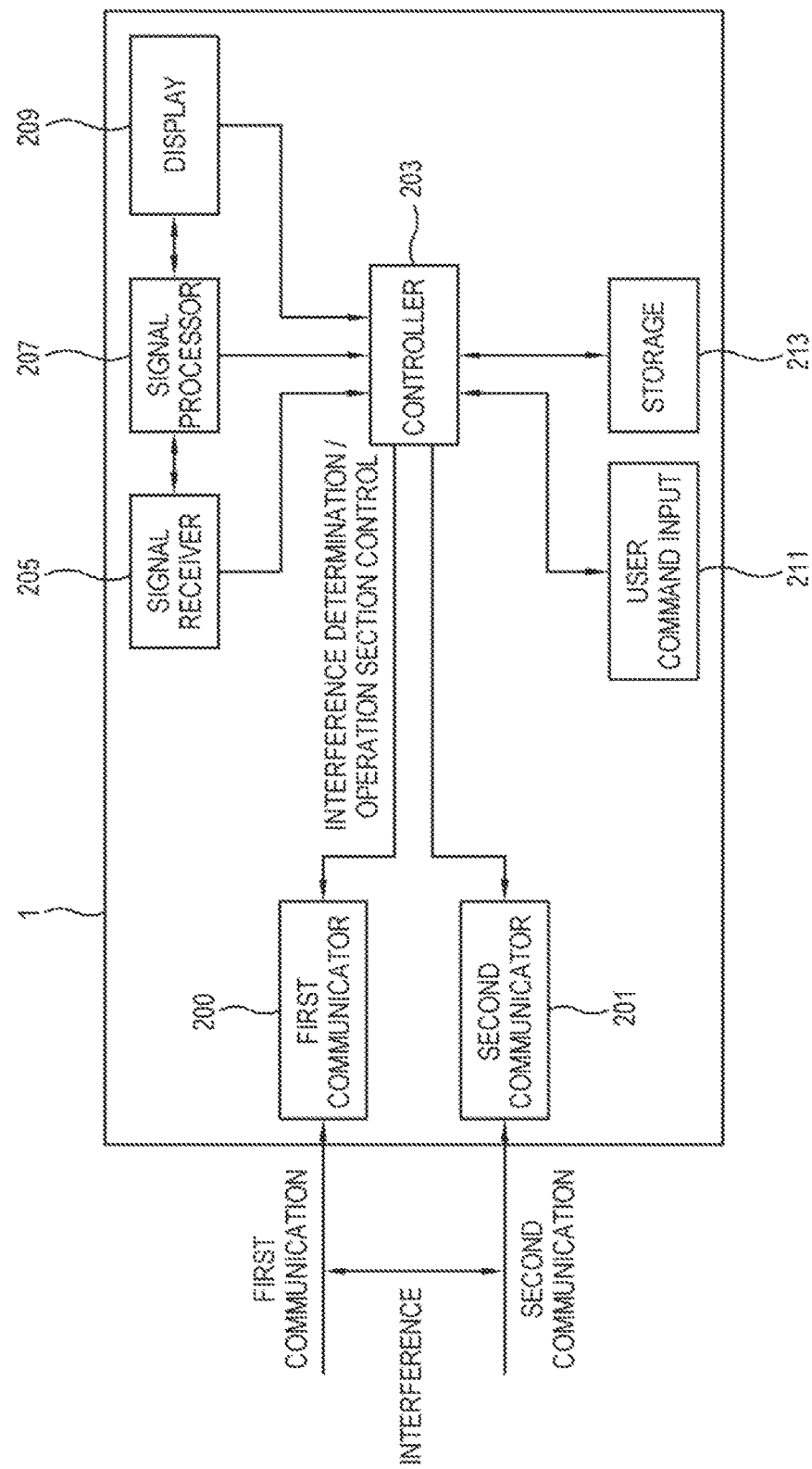
FIG. 2 is a block diagram of the electronic apparatus according to an exemplary embodiment.

FIG. 2 is a block diagram of the electronic apparatus according to an exemplary embodiment. The electronic apparatus 1 includes a first communicator 200, a second communicator 201 and a controller 203. The electronic apparatus 1 according to an exemplary embodiment may further include at least one among a signal receiver 205, a signal processor 207, a display 209, a user command input 211 and a storage 213. The structure of the electronic apparatus 1 shown in FIG. 2 is just given by way of example, and the electronic apparatus 1 according to an exemplary embodiment may have another structure as well as the structure of FIG. 2. In other words, the electronic apparatus 1 according to an exemplary embodiment may include another element in addition to the elements shown in FIG. 2, or exclude a certain element from the elements shown in FIG. 2. Further, each element may be materialized by a device, a software module, a circuit or a chip for performing the described function.

The electronic apparatus 1 may include the signal receiver 205 for receiving an image signal. The signal receiver 205 may include a tuner. The tuner is tuned to a certain channel selected by a user among a plurality of channels and receives a broadcast signal of the tuned channel. The signal receiver 205 may receive an image signal from an image processing apparatus such as a set-top box, a digital versatile disc (DVD), a personal computer, etc., from a mobile apparatus such as a smart phone, etc., or from a server through Internet.

The signal processor 207 applies an imaging process to the image signal received in the signal receiver 205, so that the display 209 can display an image based on the image signal subject to the imaging process. The imaging process performed by the signal processor 207 may for example include demultiplexing for dividing a transport stream including an image signal into sub streams of a video signal, an audio signal and appendix data; de-interlacing for converting an interlaced-type image signal into a progressive-type image signal; scaling for adjusting a resolution of an image signal; noise reduction for improving quality of an image; detail enhancement; frame refresh rate conversion; etc.

The display 209 displays an image. There are no limits to the type of display 209, and the display 209 may be for example achieved by various display types such as liquid crystal, plasma, a light-emitting diode, an organic light-emitting diode, a surface-conduction electron-emitter, a carbon nano-tube), nano-crystal, etc.

If the display 209 is the type of liquid crystal, it includes a liquid crystal display panel, a backlight unit for emitting light to the liquid crystal display panel, a panel driving substrate for driving the liquid crystal display panel, etc. The display 209 may be achieved by a self-emissive organic light emitting diode (OLED) panel without the backlight unit.

The user command input 211 receives a user's input and sends it to the controller 203. The user command input 211 may be variously materialized in accordance with a user's input type. For example, the user command input 211 may include a menu button installed outside the electronic apparatus 1; a remote-control signal receiver for receiving a remote-control signal corresponding to a user's input from a remote controller; a touch screen provided on the display 209 and receiving a user's touch input; a camera for sensing a user's gesture input; a microphone for receiving a user's voice input; a sensor for sensing a user's motion; etc.

The storage 213 is configured to store various pieces of data of the electronic apparatus 1. The storage 213 may be achieved by a nonvolatile memory (or a writable read only memory (ROM)) which retains data even though the electronic apparatus 1 is powered off, and reflects changes. That is, the storage 213 may be achieved by one of a flash memory, an erasable and programmable read only memory (EPROM) and an electrically erasable and programmable read only memory (EEPROM). The storage 213 may further include a volatile memory such as a dynamic random access memory (DRAM) or a static random access memory (SRAM) which has a higher reading or writing speed of the electronic apparatus 1 than the nonvolatile memory.

Below, for convenience of description, it will be described that a plurality of communicators 200 and 201 includes the first communicator 200 and the second communicator 201. However, the disclosed inventive concept is not limited to the number of communicators 200 and 201. The first communicator 200 and the second communicator 201 are configured to communicate with the external apparatus. The first communicator 200 and the second communicator 201 may be materialized in various ways in accordance with the kinds of communications. The first communicator 200 may have a first operation mode for performing a first communication and a first idle mode for pausing the first communication. Further, the second communicator 201 may have a second operation mode for performing a second communication different in standard from the first communication and a second idle mode for pausing the second communication.

Each of the first communicator 200 and the second communicator 201 may include a radio frequency (RF) circuit for transmitting and receiving an RF signal for wireless communication, and perform one or more communications among Wi-Fi, Bluetooth, Zigbee, ultra-wide band (UWM), wireless universal serial bus (USB), and near field communication (NFC). In this exemplary embodiment the first communication and the second communication are performed within adjacent frequency bands. Below, it will be described for convenience of description that the first communication and the second communication are respectively a Bluetooth communication and an institute of electrical and electronics engineers (IEEE) 802.11 communication (or W-Fi) each of which is performed within a frequency band of 2.4 GHz. However, the disclosed inventive concept is not limited to the described communication standards.

Figure 3:
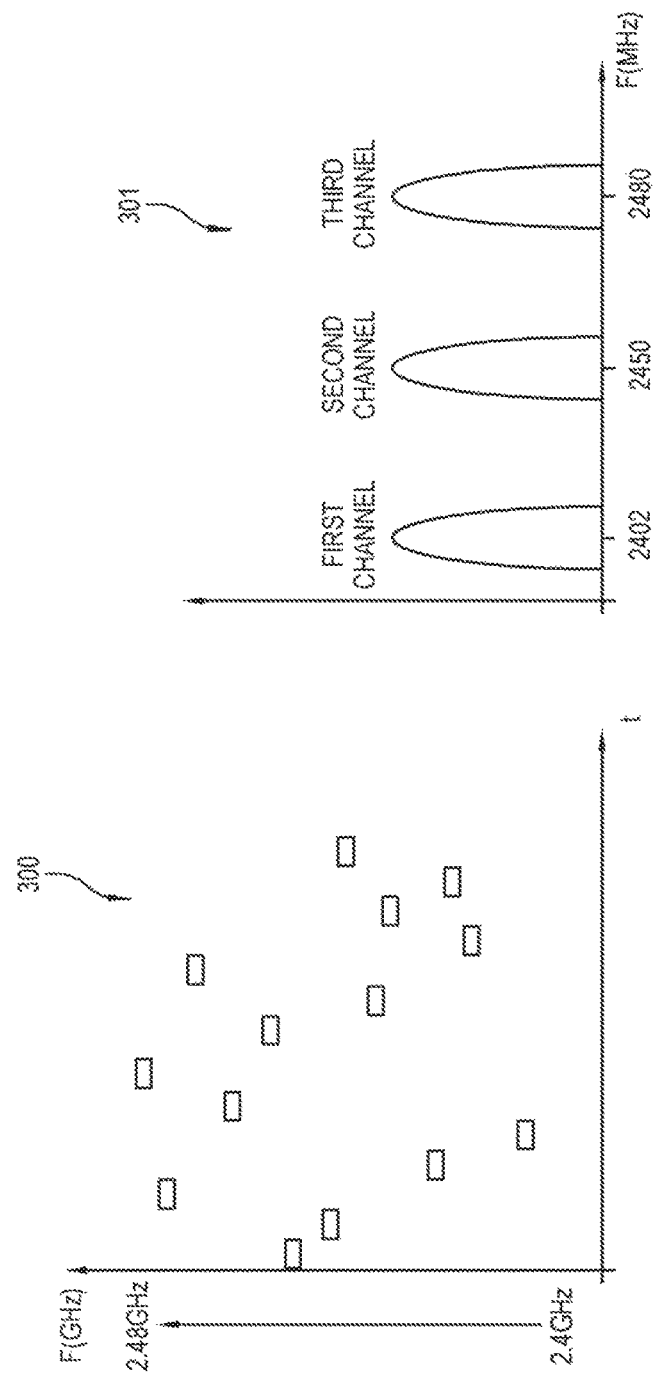
FIG. 3 illustrates operations of a first communicator and a second communicator according to an exemplary embodiment.

The first communication and the second communication will be described with reference to FIG. 3. The Bluetooth communication, i.e. the first communication refers to short-range wireless communication technology for connecting portable devices such as a mobile phone, a notebook computer, an earphone, etc. and implements frequency hopping at a rate of about 1,600 or more hops per second within the 2.4 GHz frequency band to communicate with an external apparatus 2. The frequency hopping is a communication method where a given bandwidth is divided in to a plurality of hopping channels and data is transmitted and received while changing the plurality of divided channels. The first communicator 200 exchanges data with the external apparatus 2 while hopping between the plurality of hopping channels divided within the given bandwidth of 2.4 GHz based on communication protocols. Referring to the reference numeral of '300' in FIG. 3, the first communicator 200 implements a communication while hopping between 2.4 GHz and 2.48 GHz.

The IEEE 802.11 communication, i.e. the second communication refers to technology for a wireless local area network (WLAN), which is also called wireless fidelity (W-Fi). The second communication connects a hot spot (or an access point (AP)) with Ethernet, and wirelessly connects the hot spot with the electronic apparatus 1 to thereby connect the electronic apparatus 1 with the Ethernet. The second communication is implemented using a certain channel selected within the 2.4 GHz frequency band. Referring to the reference numeral of '301' in FIG. 3, the second communicator 201 uses three channels between 2.4 GHz and 2.48 GHz to implement the communication, but this is given just for example. That is, there are no limits to the number of channels in the IEEE 802.11 communication. The IEEE 802.11 communication may have fourteen channels overlapped with each other by about a 22 MHz bandwidth within a given frequency band, and uses a channel selected among them to implement the communication. In FIG. 3, the second communicator 201 selects one among three channels, and uses a signal having a frequency of the selected channel to thereby perform the second communication. The selection of the channel may be carried out when the AP is initialized.

The disclosed inventive concept is not limited to the accompanying drawings and the detailed description. The electronic apparatus 1 according to an exemplary embodiment may be applied to the wireless communications of various standards using the adjacent frequency bands.

If interference occurs in the selected channel, the second communicator 201 of transmitting and receiving the signal having the frequency of the selected channel may operate time-divisionally using the selected channel together with the first communicator 200 under control of the controller 203.

The controller 203 performs control for operating general elements of the electronic apparatus 1. The controller 203 may include a control program for implementing such control, a nonvolatile memory in which the control program is installed, a volatile memory to which the installed control program is at least partially loaded, and at least one microprocessor or central processing unit (CPU) for executing the loaded control program. The control program may include program(s) achieved in the form of at least one among a basic input/output system (BIOS), a device driver, an operating system (OS), a firmware, a platform, and an application program. According to an exemplary embodiment, the control program may be previously installed or stored in the electronic apparatus 1 when the electronic apparatus 1 is manufactured, or installed later in the electronic apparatus 1 based on data of an application program received from the outside when it is needed. The data of the application program may be for example downloaded from an application market and the like external server to the electronic apparatus 1.

According to an exemplary embodiment, the controller 203 controls the first communicator 200 and the second communicator 201 to adjust the length of the simultaneous operation section (see '502' in FIG. 5) where the first operation mode and the second operation mode are simultaneously implemented in accordance with the degree of the interference between the first communication and the second communication.

Figure 4:
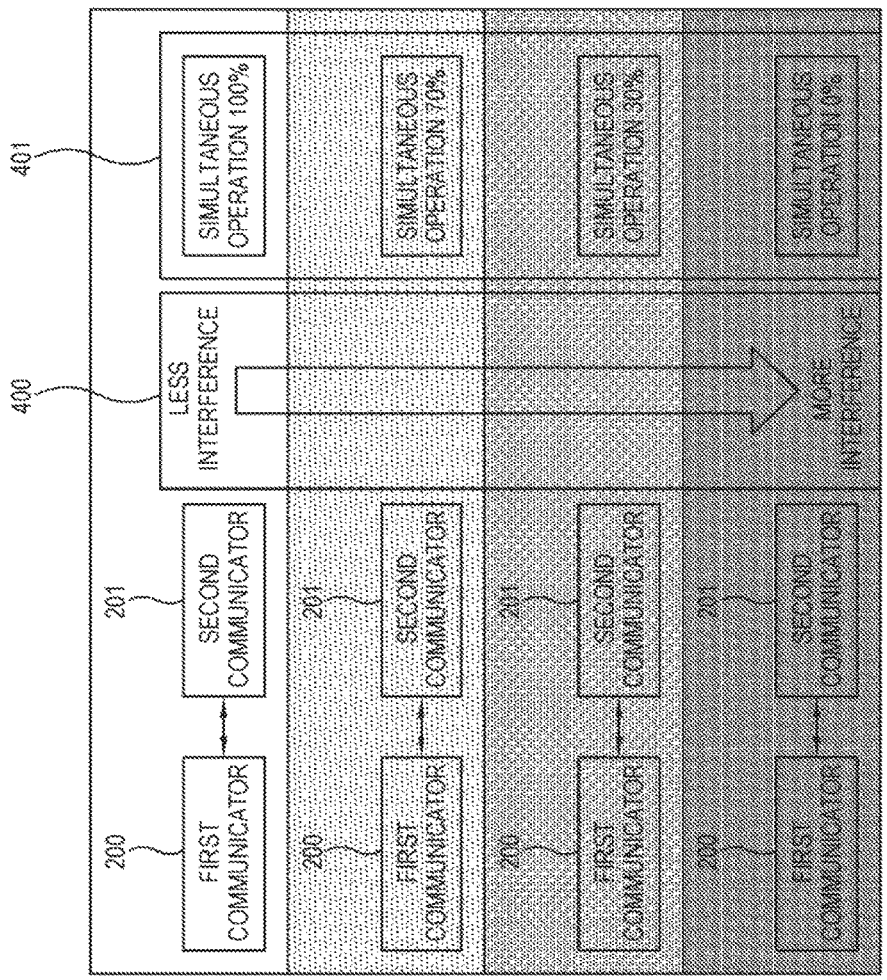
FIG. 4 illustrates operations of the electronic apparatus according to an exemplary embodiment.

Below, a method of adjusting the simultaneous operation section will be described with reference to FIG. 4 and FIG. 5. FIG. 4 illustrates operations of the electronic apparatus according to an exemplary embodiment. The controller 203 determines the degree of the interference between the first communication and the second communication, and adjusts the simultaneous operation section 502 in accordance with the determined degree of the interference. According to an exemplary embodiment, the controller 203 decreases the simultaneous operation section 502 as the degree of the interference becomes greater. If the degree of the interference is greater than a threshold level, the controller 203 may minimize the simultaneous operation section 502 so that the first communication and the second communication can be fully time-divisionally implemented. The reference numeral of '400' shows a direction in which the degree of the interference becomes greater. The reference numeral of '401' shows that the simultaneous operation section 502 where the first communication and the second communication are simultaneously implemented is decreased as the degree of the interference becomes greater.

Figure 5:
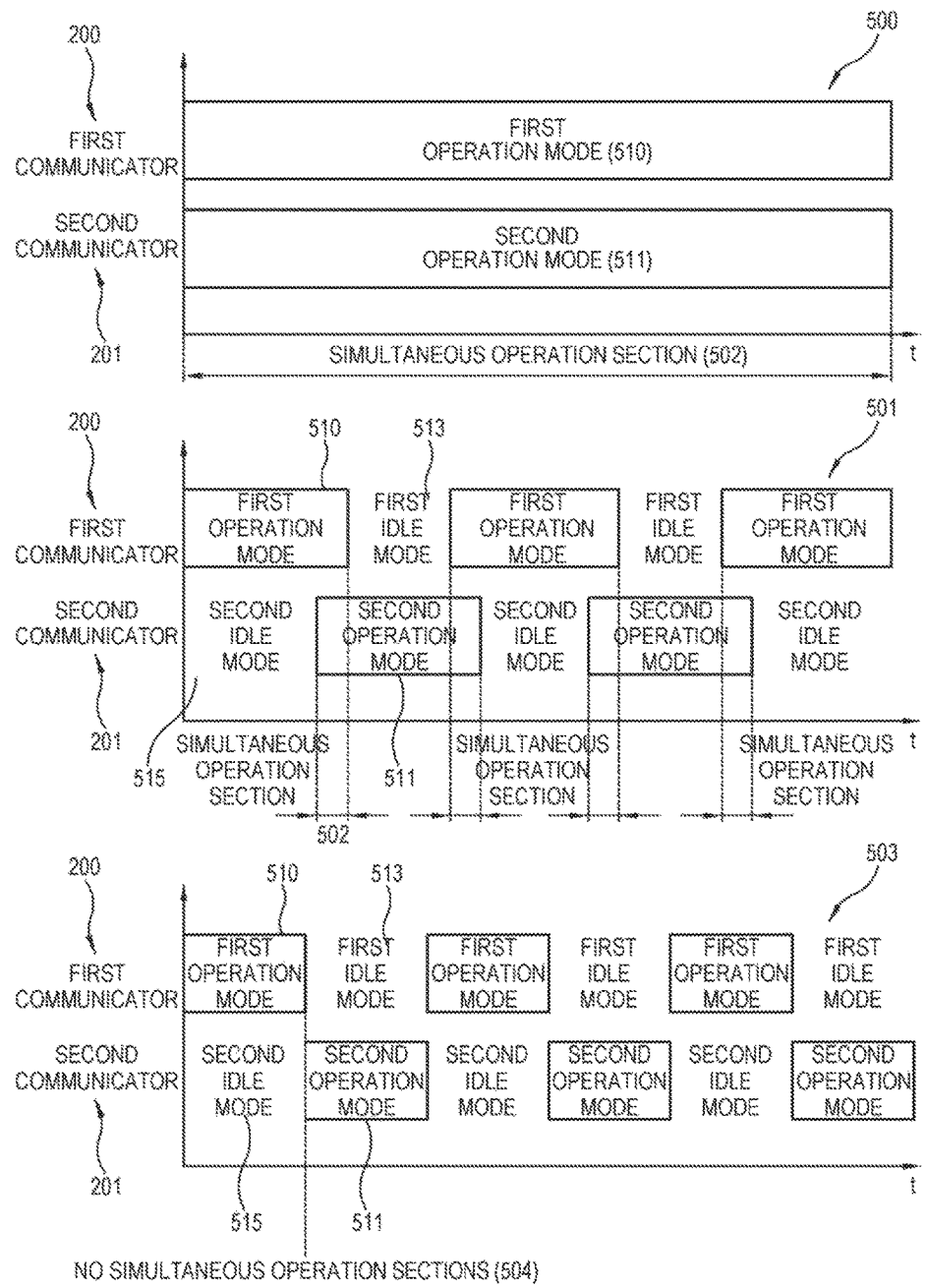
FIG. 5 illustrates an example of modifying a simultaneous operation section in accordance with a degree of interference in the electronic apparatus according to an exemplary embodiment.

FIG. 5 illustrates that the first communicator and the second communicator adjust the simultaneous operation section 502 under control of the controller 203. The controller 203 modifies a section where a first operation mode 510 and a second idle mode 515 are simultaneously implemented, or a section wherein a second operation mode 511 and a first idle mode 513 are simultaneously implemented, thereby adjusting the simultaneous operation section 502.

The reference numeral of '500' shows a state that the degree of the interference between the first communication and the second communication is equal to or smaller than a first threshold level, i.e. a state that the simultaneous operation section 502 is maximized. The first operation mode 510 and the second operation mode 511 are simultaneously implemented. The electronic apparatus 1 may operate like the state indicated by the reference numeral of '500' even when the interference occurs in another channel different from the channel for the second communication. The reference numeral of '501' shows a state that the degree of the interference between the first communication and the second communication is between the first threshold level and the second threshold level higher than the first threshold level, i.e. that the simultaneous operation section 502 is decreased. A part of the first operation mode 510 occurs simultaneously with the second operation mode 511, but the rest of the first operation mode 510 occurs simultaneously with the second idle mode 515. Likewise, a part of the second operation mode 511 occurs simultaneously with the first operation mode 510, but the rest of the second operation mode 511 occurs simultaneously with the first idle mode 513. The controller 203 adjusts the simultaneous operation section 502 by controlling the length and times of a section where the first idle mode 513 and the second idle mode 515 occur. Alternatively, the controller 203 may control the first communicator 200 and the second communicator 201 to time-divisionally implement part of the first communication and the second communication only in the frequency corresponding to the channel for the second communication like the state indicated by the reference numeral of '501'. The reference numeral of '503' shows a state that the degree of the interference between the first communication and the second communication is greater than the second threshold level, i.e. a state 504 that the simultaneous operation section 502 is minimized. The first operation mode 510 occurs simultaneously with the second idle mode 515, and the second operation mode 511 occurs simultaneously with the first idle mode 513. In the state indicated by the reference numeral of '503', the first communication and the second communication are completely time-divisionally implemented, and therefore a signal has no distortion or the like due to the interference. Alternatively, the controller 203 may control the first communicator 200 and the second communicator 201 to time-divisionally implement the first communication and the second communication only in the frequency corresponding to the channel for the second communication.

According to another exemplary embodiment, if the first communicator 200 performs the foregoing frequency hopping and the second communicator 201 performs the communication in the selected channel, the controller 203 modifies the length of the simultaneous operation section 502 of the first communication and the second communication only in the channel where the second communicator 201 performs the communication.

Below, a method of how the electronic apparatus 1 determines the degree of the interference will be described with reference to FIGS. 6 and 7. The electronic apparatus 1 may determine the degree of the interference based on intensity of a signal exchanged between the communicators 200 and 201, or may determine the degree of the interference based on intensity of a signal received when one of the communicators 200 and 201 is in the idle mode and the operation mode.

Figure 6:
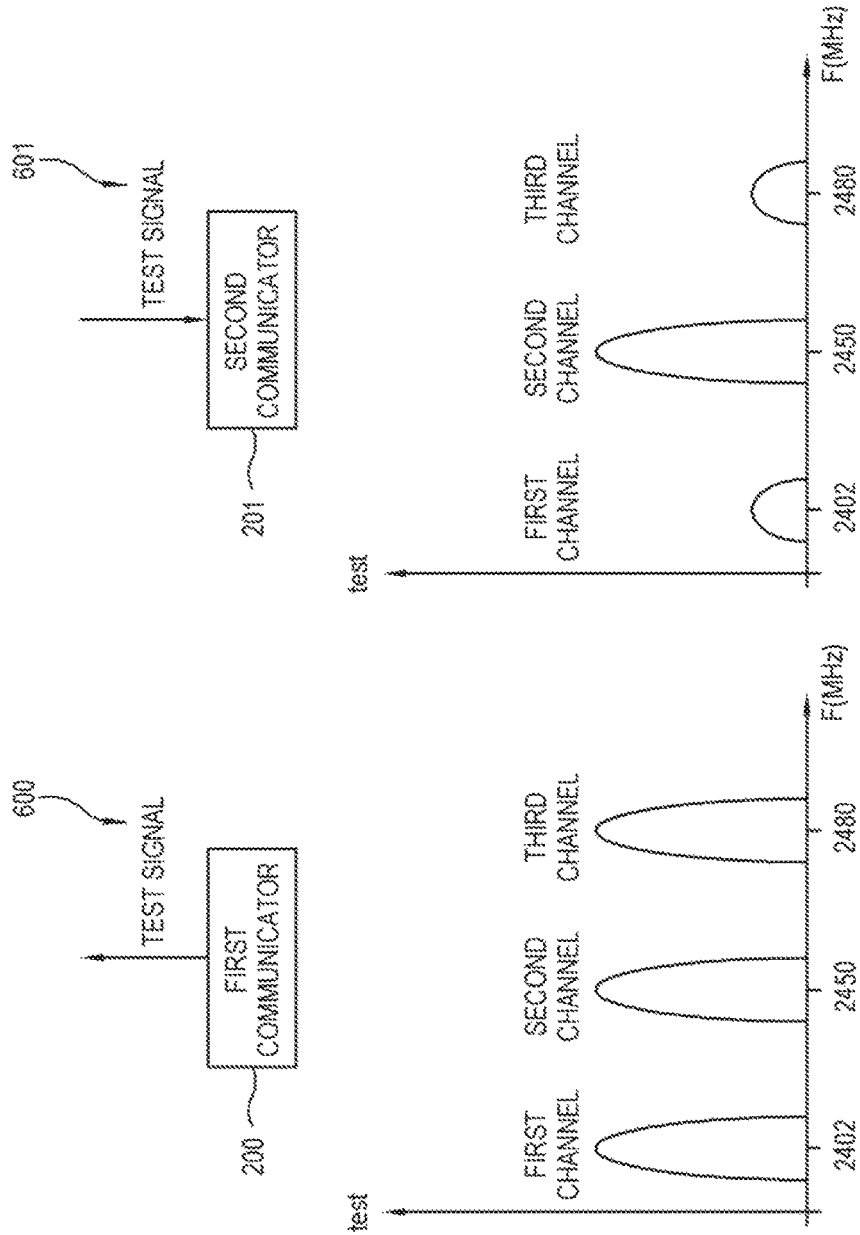
FIG. 6 illustrates an example of determining the degree of the interference based on a test signal transmitted and received between respective communicators according to an exemplary embodiment.

FIG. 6 illustrates an example of determining the degree of the interference based on a test signal transmitted and received between respective communicators according to an exemplary embodiment. The controller 203 may determine the degree of the interference based on a signal transmitted from one of the first communicator 200 and the second communicator 201 and received in the other one. To determine the degree of the interference, the electronic apparatus 1 may operate in a test mode. In the test mode, the controller 203 controls either of the first communicator 200 or the second communicator 201 to output a test signal 600. The controller 203 controls one of the first communicator 200 and the second communicator 201 to output the test signal 600 while using a plurality of channels, where the second communicator 201 can implement the second communication, in sequence or in a lump. Since the output test signal 600 involves a specific pattern based on amplitude modulation, frequency modulation, etc., the controller 203 can determine whether a signal received in the first communicator 200 or the second communicator 201 is a test signal 601 or interference due to ambient noise. Based on the strength of the received test signal 601, the controller 203 determines degree of interference and a frequency at which the interference occurs. If the frequency at which the interference occurs is the same as that of the channel where the second communication is implemented, the controller 203 controls the first communicator 200 and the second communicator 201 to time-divisionally implement the first communication and the second communication at the frequency of the channel where the interference occurs. Alternatively, the controller 203 may control the first communicator 200 to output a test signal 600 having a frequency corresponding to a channel selected for implementing the second communication.

Referring to FIG. 6, the first communicator 200 transmits the test signal 600 through the plurality of channels where the second communication can be implemented. The transmitted test signal 600 has strength of the same or adjacent range in each channel. The controller 203 determines that the degree of the interference increases in proportion to the strength of the received test signal 601. The controller 203 determines the interference according to the respective channels of the test signal 601 received through the second communicator 201. The received test signal 601 has the highest strength in the second channel. Therefore, the controller 203 determines the degree of the interference based on the strength of the test signal 601 in the second channel if the second communication is implemented through the second channel. Further, the controller 203 controls the first communicator 200 and the second communicator 201 to adjust the simultaneous operation section (see '502' in FIG. 5) between the first communication and the second communication at the frequency of the second channel based on the determined degree of the interference. If the strength of the test signal 601 in the second channel is higher than the second threshold level, the controller 203 may control the first communicator 200 and the second communicator 201 to minimize the simultaneous operation section 502 between the first communication and the second communication. Likewise, if the second communication is implemented through the first channel or the third channel, the degree of the interference is determined based on the strength of the test signal 601 in the first channel or the third channel. Since the strength of the test signal 601 in the first channel and the third channel is lower than the strength of the test signal 601 in the second channel, the simultaneous operation section 502 for the first channel and the third channel is adjusted to be longer than that for the second channel. On the other hand, if the strength of the test signal 601 in the first channel and the third channel is equal to or lower than the first threshold level, it is determined that there is little interference. The controller 203 may control the first communicator 200 and the second communicator 201 to maximize the simultaneous operation section 502 between the first communication and the second communication.

Figure 7:
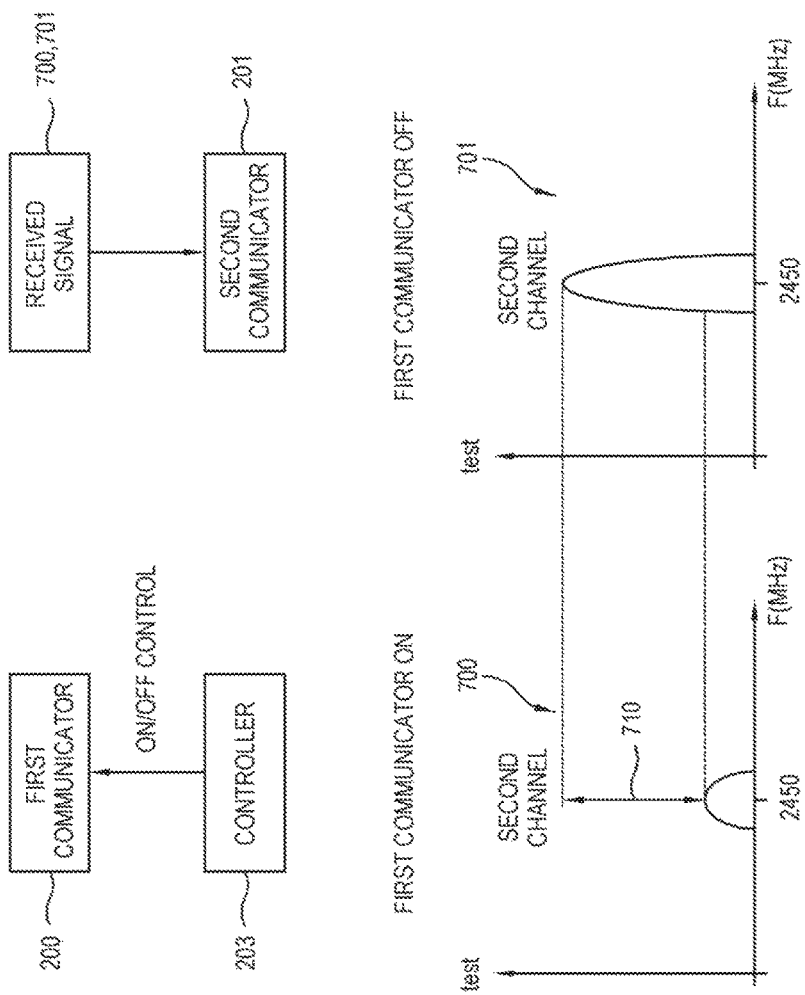
FIG. 7 illustrates an example of determining the degree of the interference based on the strength of a signal received in a second communicator when a first communicator is in an operation mode and an idle mode according to an exemplary embodiment.

FIG. 7 illustrates an example of determining the degree of the interference based on the strength of a signal received in the second communicator when the first communicator is in the operation mode and the idle mode. When one of the first communicator 200 and the second communicator 201 is in the idle mode or the operation mode, the controller 203 can determine the degree of the interference based on the strength of the signal received in the other one. At this time, the received signal includes a data signal received from the outside or a feedback signal for informing an error rate of the transmitted signal. To sense the degree of the interference, the electronic apparatus 1 may operate in the test mode. In the test mode, the controller 203 may control one of the first communicator 200 and the second communicator 201 to be in the idle mode for a predetermined period of time, and determine the degree of the interference by comparing strength of a signal received in the other one for the predetermined period of time and strength of a signal received out of the predetermined period of time.

Referring to FIG. 7, the controller 203 controls the first communicator 200 to be selectively in the first operation mode and the first idle mode. The controller 203 determines a difference 710 in strength of a signal received in the second communicator 201 between the first operation mode and the first idle mode of the first communicator 200, and determines the degree of the interference based on the difference in the strength. The controller 203 determines that the degree of the interference increases in proportion to the difference 710 in the strength of the signal received in the second communicator 201 when the first communicator 200 switches between the modes. The reference numeral of '700' shows a signal received in the second communicator 201 when the first communicator 200 is in the first operation mode, and the reference numeral of '701' shows a signal received in the second communicator 201 when the first communicator 200 is in the first idle mode. For convenience of description, it is described in this exemplary embodiment that the degree of the interference is determined based on the difference 710 in the strength of the signal received in the second communicator 201 between ON and Off of the first communicator 200, and the second communication is using the second channel. However, this exemplary embodiment should not be construed as limiting the disclosed inventive concept.

Alternatively, the controller 203 may determine the degree of the interference based on the number of external apparatuses 2 with which it can have communications. For example, the electronic apparatus 1 may make a pairing request for communication to the plurality of external apparatuses 2. If the degree of the interference increases, the number of external apparatuses 2 for the communication is decreased since a pairing request signal is distorted and thus hardly transmitted to the external apparatuses 2. Therefore, the controller 203 may determine the degree of the interference between the first communication and the second communication based on change in the number of external apparatuses 2 with which it can communicate.

Further, the electronic apparatus 1 may determine the degree of the interference based on a data rate of data exchanged with the external apparatus 2. The data rate refers to the amount of data transmitted per unit time, and shows substantial performance of a channel through which the data is transmitted and received. The data rate may vary depending on a bandwidth, external noise, a signal transmission medium, change in surrounding environments, etc. For example, in case of IEEE 802.11 communication, if interference is detected in a channel, the data rate is lowered for reliable data transmission. Therefore, the data rate is lowered as the degree of the interference affecting the communication increases. Thus, the controller 203 may determine the degree of the interference between the first communication and the second communication based on variation in the data rate.

According to another exemplary embodiment, the electronic apparatus 1 may determine the degree of the interference based on an error rate and a retransmission rate of data exchanged with the external apparatus 2. The electronic apparatus 1 makes a request for data retransmission to the external apparatus 2 if the error rate of the data received from the external apparatus 2 is higher than the threshold level. The data may be retransmitted in units of packet or frame. Alternatively, the external apparatus 2 may make a request for data retransmission to the electronic apparatus 1 in accordance with the error rate of the data received from the electronic apparatus 1. The retransmission of the signal is inconvenient for a user since it causes wasteful iteration, badly affects the data rate, distorts content, and so on. Thus, the controller 203 determines the degree of the interference between the first communication and the second communication based on the error rate or retransmission rate of the signal received from the external apparatus 2.

Figure 8:
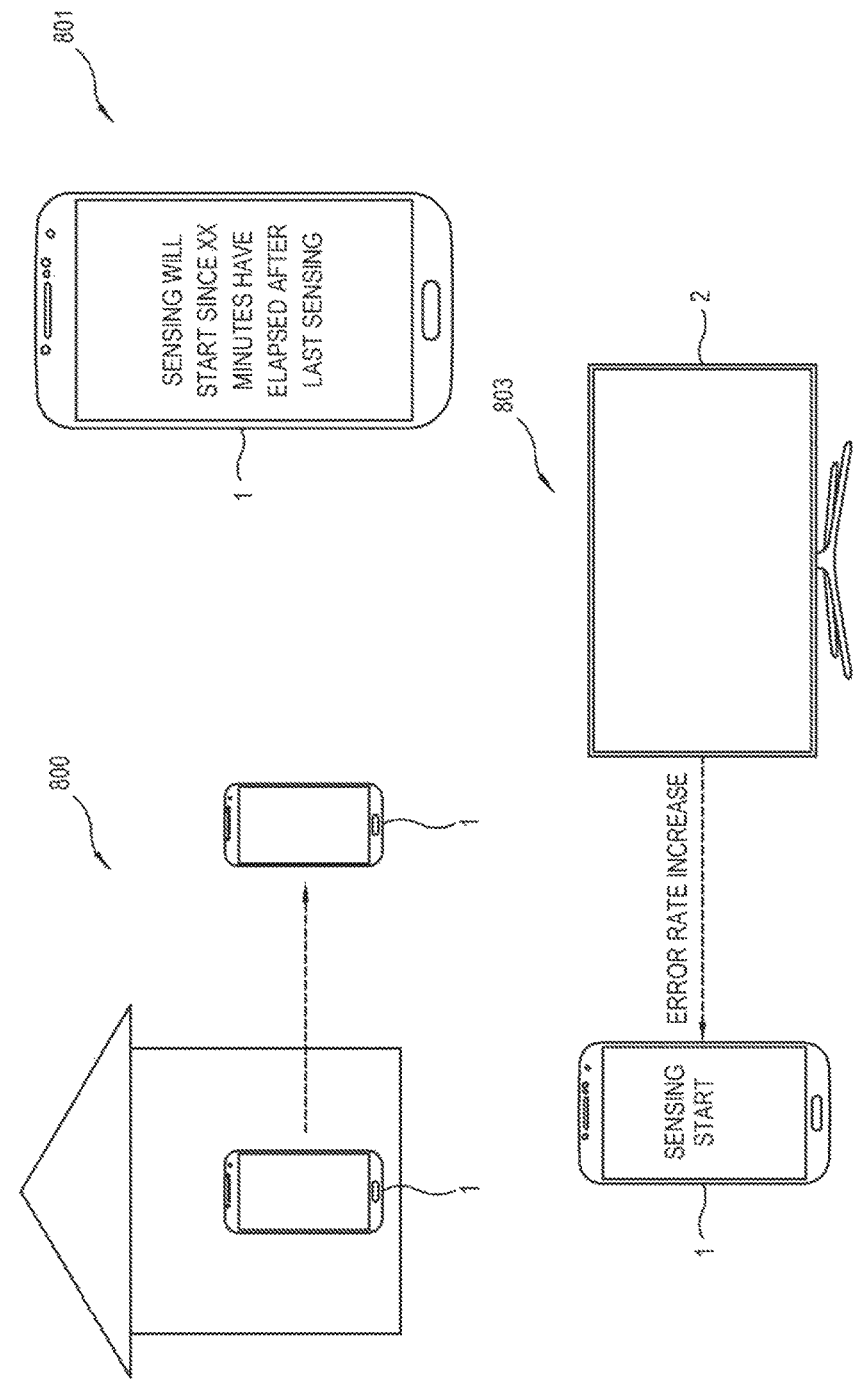
FIG. 8 illustrates an example of a condition for sensing interference according to an exemplary embodiment.

Below, a condition for sensing a degree of interference will be described with reference to FIG. 8. The controller 203 senses the degree of the interference when conditions for sensing the interference are satisfied. The conditions for sensing the interference may include at least one of feedback from the external apparatus 2, a predetermined period of time elapsed after sensing the interference, change in a position of the electronic apparatus 1, and power-on of the electronic apparatus 1.

The reference numeral of '800' shows the change in the position of the electronic apparatus 1 among the conditions for sensing the degree of the interference. The interference between the first communication and the second communication may vary depending on surrounding environments. For example, if the electronic apparatus 1 is moved from an indoor position to an outdoor position, the number of external apparatuses 2 for the communication is decreased, and reflection of electromagnetic waves is reduced, thereby decreasing the degree of the interference. When the electronic apparatus 1 is changed in position, the electronic apparatus 1 determines that the condition for sensing the degree of the interference is satisfied, and operates in the test mode or the like for determining the degree of the interference. The reference numeral of '801' shows a case where the degree of the interference is determined again after a predetermined period of time has elapsed from sensing the degree of the interference. The electronic apparatus 1 may periodically sense the interference. A period of sensing the interference may be adjusted in accordance with the degree of the interference between the first communication and the second communication. That is, the electronic apparatus 1 shortens the sensing period to more frequently sense the degree of the interference as the degree of the interference becomes higher, and lengthens the sensing period to less frequently sense the degree of the interference as the degree of the interference becomes lower. The reference numeral of '803' shows the feedback from the external apparatus 2, such as an error rate increase of signal or the like, among the conditions for sensing the degree of the interference.

Figure 9:
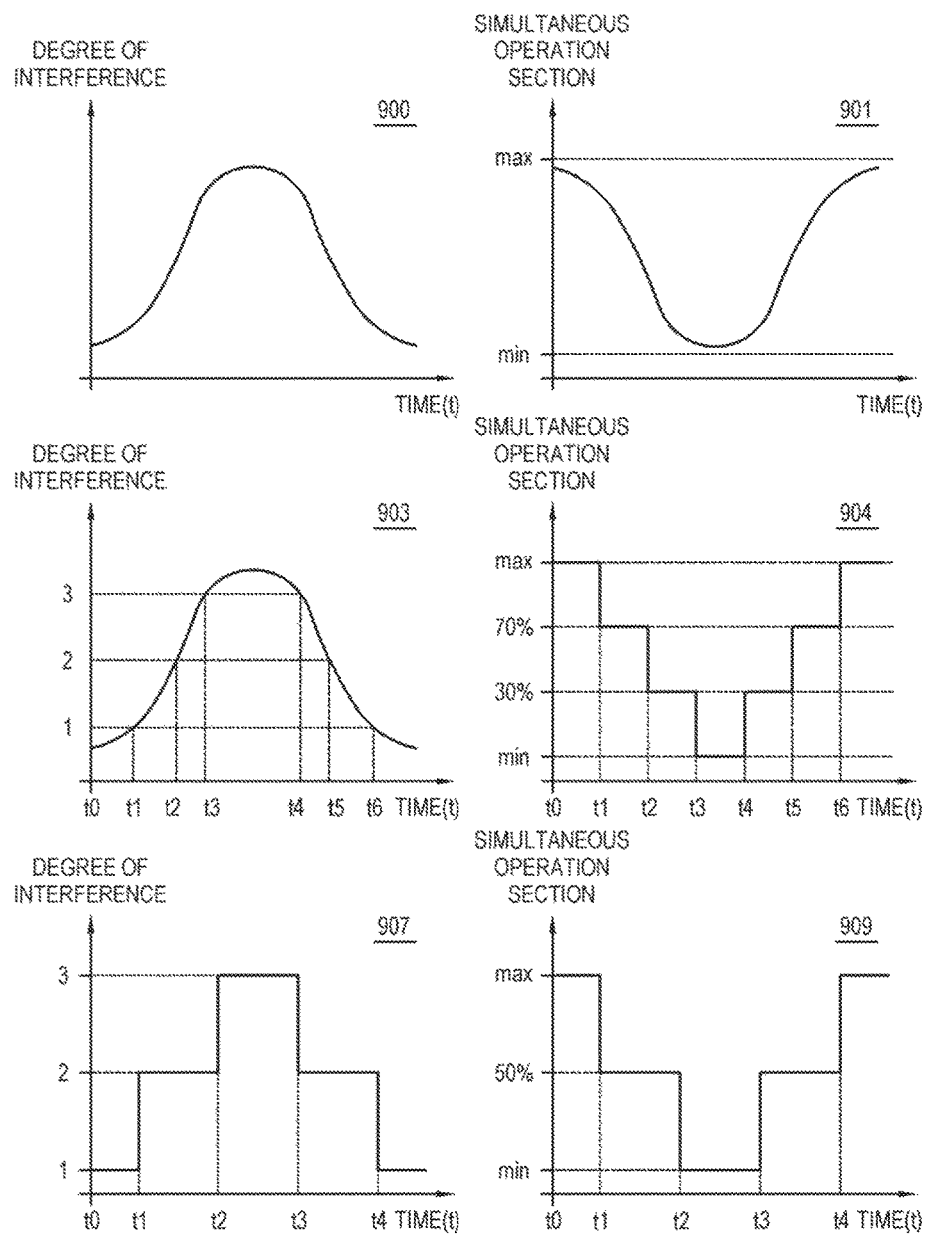
FIG. 9 illustrates waveforms of showing the degree of the interference and the simultaneous operation section according to an exemplary embodiment.

FIG. 9 illustrates waveforms of showing the degree of the interference and the simultaneous operation section according to an exemplary embodiment.

The reference numeral of '900' shows a waveform corresponding to the degree of the interference determined by the controller 203, and the reference numeral of '901' shows a waveform corresponding to the simultaneous operation section (see '502' in FIG. 5) adjusted in accordance with the determined degree of the interference. In this exemplary embodiment, the controller 203 determines the degree of the interference between the first communication and the second communication in real time, and adjusts the simultaneous operation section 502 in accordance with the determined degree of the interference. The controller 203 decreases the simultaneous operation section 502 as the degree of the interference becomes higher, and increases the simultaneous operation section 502 as the degree of the interference becomes lower.

According to another exemplary embodiment, the controller 203 may adjust the simultaneous operation section 502 in accordance with whether or not the determined degree of the interference is higher than the threshold level. The reference numeral of '903' shows a waveform corresponding to the degree of the interference determined by the controller 203, and the reference numeral of '905' shows a waveform corresponding to the simultaneous operation section 502 adjusted in accordance with whether or not the determined degree of the interference is higher than each threshold level. The controller 203 determines the degree of the interference between the first communication and the second communication in real time. In the section of t0~t1, the controller 203 keeps the maximum simultaneous operation section 502 since the determined degree of the interference is equal to or lower than the first threshold level. In the section of t1~t2, the controller 203 decreases the simultaneous operation section 502 up to 70% since the determined degree of the interference is higher than the first threshold level. In the section of t2~t3, the controller 203 decreases the simultaneous operation section 502 up to 30% since the determined degree of the interference is higher than the second threshold level. In the section of t3~t4, the controller 203 minimizes the simultaneous operation section 502 since the degree of the interference is higher than the third threshold level. In the sections t4~t5 and t5~t6, the controller 203 stepwise increases the simultaneous operation section 502 up to 30% and 70% every time when the determined degree of the interference is lower than the respective threshold levels. Since the degree of the interference is equal to or lower than the first threshold level at t6, the simultaneous operation section 502 is maximized after t6. However, this exemplary embodiment should not be construed as limiting the disclosed inventive concept.

Alternatively, the controller 203 may determine the degree of the interference not in real time but when the condition for sensing the interference is satisfied. The reference numeral of '907' shows a waveform of when the controller 203 senses the degree of the interference as the condition for sensing the interference is satisfied, and the reference numeral of '909' shows a waveform of the simultaneous operation section 502 adjusted in accordance with the determined degree of the interference. The controller 203 determines the degree of the interference at t1, t2, t3 and t4 where the conditions for sensing the interference are satisfied. Since the degree of the interference has a level of '1' at t0, the controller 203 controls the simultaneous operation section 502 to be maximized. At t1, the condition for sensing the interference is satisfied, and thus the controller 203 determines the degree of the interference. Since the degree of the interference determined at t1 has a level of '2', the controller 203 adjusts the simultaneous operation section 502 up to 50%. At t2, the condition for sensing the interference is satisfied, and thus the controller 203 determines the degree of the interference. Since the degree of the interference determined at t2 has a level of '3', the controller 203 adjusts the simultaneous operation section 502 to be minimized. Then, the controller 203 increases the simultaneous operation section 502 in sequence based on the degrees of the interference determined at t3 and t4.

FIG. 10 shows simulation results of the electronic apparatus according to an exemplary embodiment. The simulation is carried out on the condition that the electronic apparatus 1 and the plurality of external apparatus 2 are adjacent to each other. The simulation is carried out to measure the number of external apparatuses to be paired with the electronic apparatus 1, the retransmission rate, the data rate, etc. in each of a case where an algorithm according to an exemplary embodiment is not applied, a case where an algorithm according to an exemplary embodiment is applied, a case where the first communicator 200 operates independently, a case where the second communicator 201 operates independently, and a case where the first communicator 200 and the second communicator 201 completely time-divisionally operate.

When the first communicator 200 operates independently, it is measured that the electronic apparatus 1 can be paired with four external apparatuses 2 for the first communication and a retransmission rate is 0%. When the second communicator 201 operates independently, it is measured that a data rate for the second communication is 80 Mbps and a retransmission rate is 0%. When the first communicator 200 and the second communicator 201 completely time-divisionally operate, it is measured that the electronic apparatus 1 can be paired with two external apparatuses 2 for the first communication, a data rate for the second communication is 45 Mbps, and a retransmission rate is 0%. That is, it will be understood that the communication is reliable with the retransmission rate of 0% even though the first communication and the second communication are halved in efficiency. In the case where the algorithm according to an exemplary embodiment is not applied, that is, when the first communication and the second communication is operating simultaneously, it is measured that the electronic apparatus 1 can be paired with one external apparatus 2 for the first communication, a data rate for the second communication is of 10 Mbps, and a retransmission rate is 40%. That is, the interference between the first communication and the second communication reduces the number of external apparatus 2 to be paired for the first communication, lowers the data rate for the second communication, and increases the retransmission rate due to the error of the data. In the case where the algorithm according to an exemplary embodiment is applied, that is, when the first communication and the second communication are implemented in the simultaneous operation section (see '502' in FIG. 5) adjusted in accordance with the degree of the interference between the first communication and the second communication, it is measured that the electronic apparatus 1 can be paired with four external apparatuses 2 for the first communication, a data rate for the second communication is of 55 Mbps, and a retransmission rate is 5%. If the algorithm according to an exemplary embodiment is applied, the first communication and the second communication are simultaneously implemented in the section with no interference but time-divisionally implemented in the section with interference, thereby increasing a communication efficiency more highly than those of when the first communication and the second communication are completely time-divisionally operate and simultaneously operate in the full section.

Figure 11:
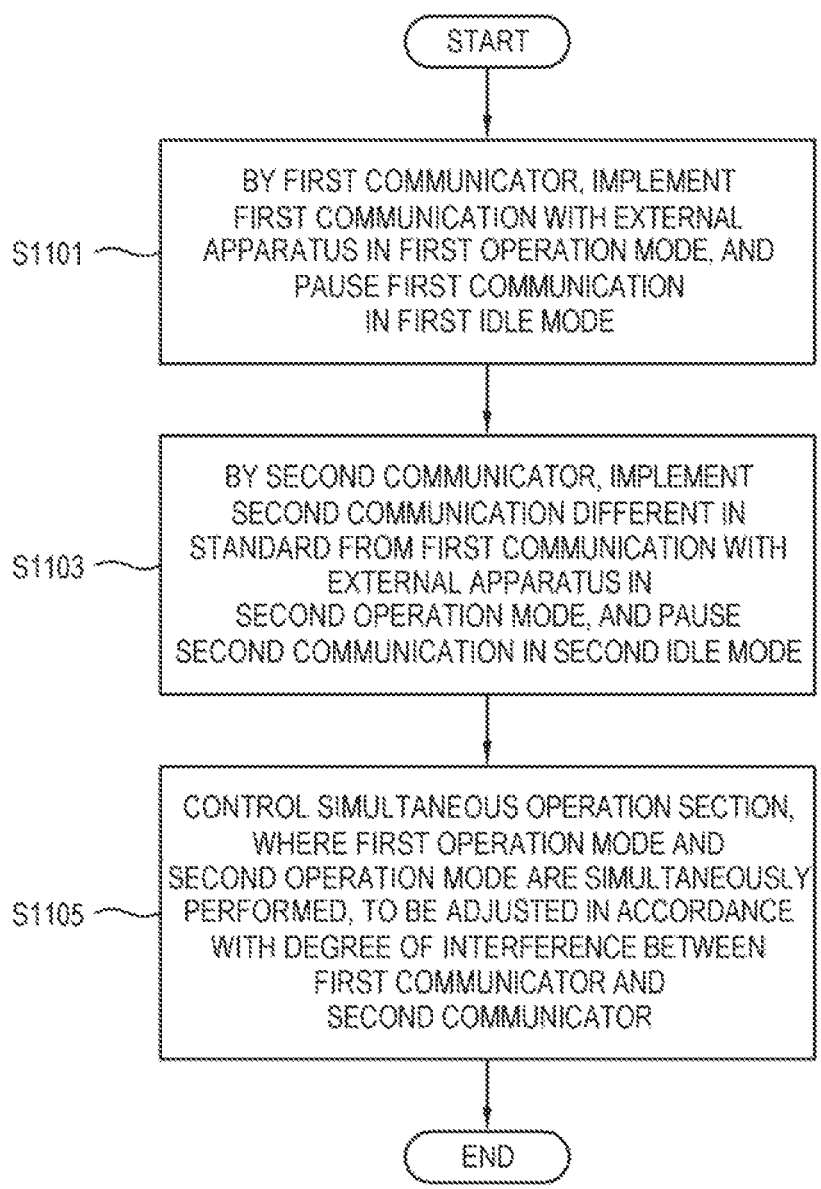
FIG. 11 shows a flowchart of controlling the electronic apparatus according to an exemplary embodiment.

FIG. 11 shows a flowchart of controlling the electronic apparatus according to an exemplary embodiment. First, at operation S1101, the first communicator 200 implements the first communication with the external apparatus 2 in the first operation mode, and pauses the first communication in the first idle mode. At operation S1103, the second communicator 201 implements the second communication different in standard from the first communication with the external apparatus 2 in the second operation mode, and pauses the second communication in the second idle mode. At operation S1105, the controller 203 controls the simultaneous operation section (see '502' in FIG. 5), where the first operation mode and the second operation mode are simultaneously performed, to be adjusted in accordance with the degree of the interference between the first communicator 200 and the second communicator 201.

As described above, according to an exemplary embodiment, the respective operation sections for the plurality of communications are adjusted in accordance with the degree of the interference between the plurality of communications, thereby efficiently eliminating the interference and thus improving performance of wireless communication.

Although exemplary embodiments have been shown and described, it will be appreciated by those skilled in the art that changes may be made to these exemplary embodiments without departing from the principles and spirit of the disclosure, the scope of which is defined in the appended claims and their equivalents.

What is claimed is:

1. An electronic apparatus, comprising:
a first communicator configured to switch between a first operation mode for performing a first communication with an external apparatus, and a first idle mode for pausing the first communication;
a second communicator configured to switch between a second operation mode for performing a second communication different in standard from the first communication with an external apparatus, and a second idle mode for pausing the second communication; and
a controller configured to control the first communicator and the second communicator to adjust a length of a simultaneous operation section where the first operation mode and the second operation mode are simultaneously performed, based on a degree of interference between the first communication and the second communication.

2. The electronic apparatus according to claim 1, wherein the controller is configured to control the first communicator and the second communicator to decrease the length of the simultaneous operation section as the degree of the interference increases.

3. The electronic apparatus according to claim 1, wherein the controller is configured to minimize the length of the simultaneous operation section if the degree of the interference is higher than a threshold level.

4. The electronic apparatus according to claim 1, wherein the controller is configured to determine the degree of the interference if a condition for sensing the interference is satisfied.

5. The electronic apparatus according to claim 4, wherein the condition for sensing the interference comprises at least one of receiving feedback from an external apparatus, a predetermined period of time elapsing after a previous determination of the degree of the interference, a change in position of the electronic apparatus, and a powering-on of the electronic apparatus.

6. The electronic apparatus according to claim 1, wherein the controller is configured to determine the degree of the interference based on an error rate of a signal received by one of the first communicator and the second communicator from an external apparatus.

7. The electronic apparatus according to claim 1, wherein the controller is configured to determine the degree of the interference based on a signal transmitted from one of the first communicator and the second communicator and received in the other one of the first communicator and the second communicator.

8. The electronic apparatus according to claim 7, wherein the signal has a frequency corresponding to at least one of the first communication and the second communication.

9. The electronic apparatus according to claim 1, wherein the controller is configured to determine the degree of the interference based on a difference between a first signal received in the first communicator during the simultaneous operation section and a second signal received in the first communicator while the second communicator is in the second idle mode.

10. A method of controlling an electronic apparatus, the method comprising:
selectively controlling between performing a first communication with an external apparatus in a first operation mode and pausing the first communication in a first idle mode;
selectively controlling between performing a second communication different in standard from the first communication with an external apparatus in a second operation mode and pausing the second communication in a second idle mode; and
adjusting a length of a simultaneous operation section where the first operation mode and the second operation mode are simultaneously performed, based on a degree of interference between the first communication and the second communication.

11. The method according to claim 10, wherein the adjusting the length of the simultaneous operation section comprises:
decreasing the length of the simultaneous operation section as the degree of the interference increases.

12. The method according to claim 10, wherein the adjusting the length of the simultaneous operation section comprises:
minimizing the length of the simultaneous operation section if the degree of the interference is higher than a threshold level.

13. The method according to claim 10, wherein the adjusting the length of the simultaneous operation section comprises:
determining the degree of the interference if a condition for sensing the interference is satisfied.

14. The method according to claim 13, wherein the condition for sensing the interference comprises at least one of receiving feedback from an external apparatus, a predetermined period of time elapsing after a previous determination of the degree of the interference, a change in position of the electronic apparatus, and a powering-on of the electronic apparatus.

15. The method according to claim 10, wherein the adjusting the length of the simultaneous operation section comprises:
determining the degree of the interference based on an error rate of a received signal.

16. The method according to claim 10, wherein the adjusting the length of the simultaneous operation section comprises:
determining the degree of the interference based on a signal transmitted by performing one of the first communication and the second communication and received by performing the other one of the first communication and the second communication.

17. The method according to claim 16, wherein the signal has a frequency corresponding to at least one of the first communication and the second communication.

18. The method according to claim 10, wherein the adjusting the length of the simultaneous operation section comprises:
determining the degree of the interference based on a difference between a first signal received by performing the first communication during the simultaneous operation section and a second signal received by performing the first communication in the second idle mode.

* * * * *